Dec. 16, 1952 F. BROWN 2,621,956
COMBINATION BUMPER GUARD AND JACK
Filed Aug. 4, 1950 2 SHEETS—SHEET 1
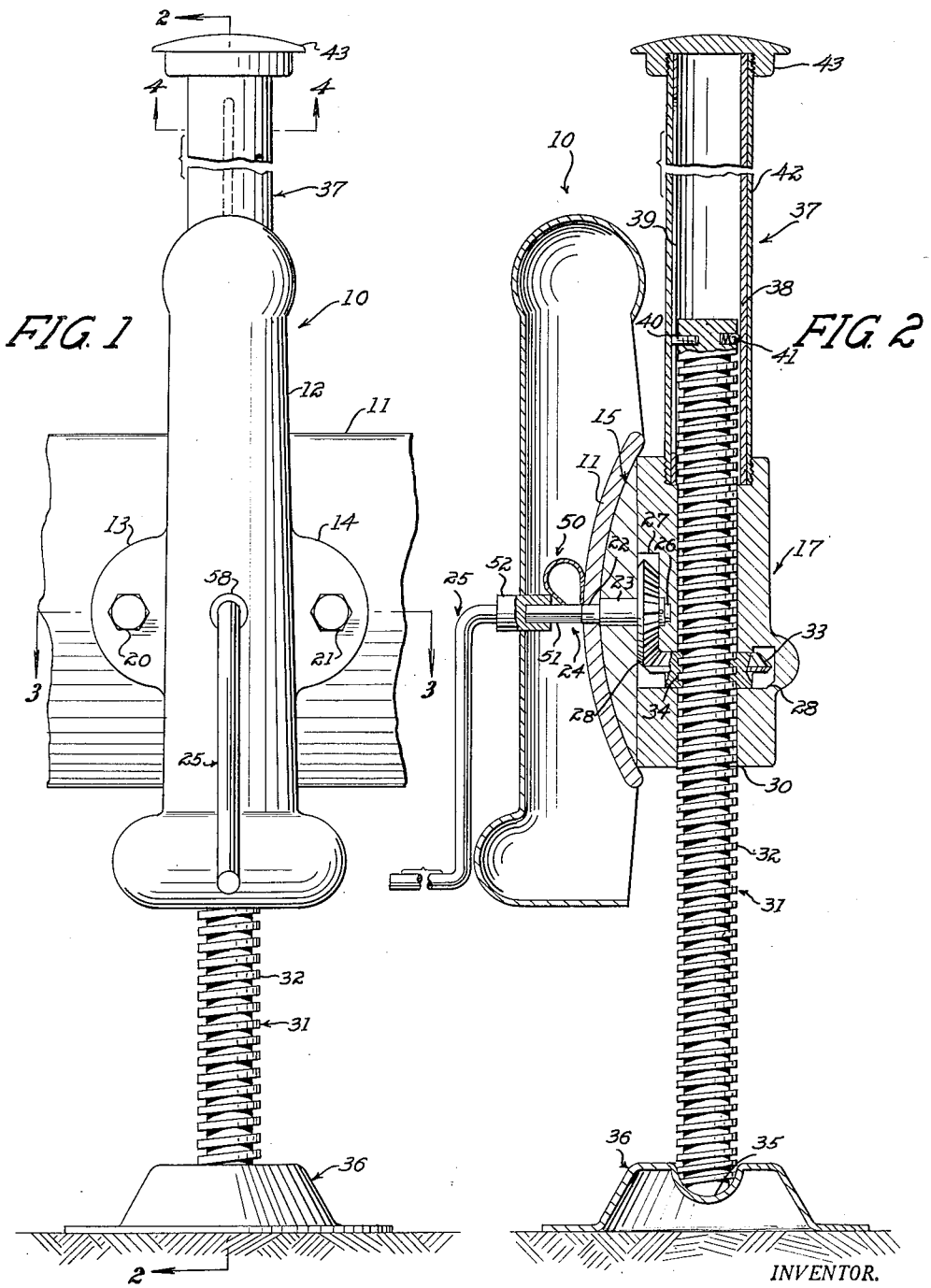
INVENTOR.
FREDERICK BROWN
BY
McMorrow, Berman + Davidson
ATTORNEYS Dec. 16, 1952   F. BROWN   2,621,956
COMBINATION BUMPER GUARD AND JACK
Filed Aug. 4, 1950   2 SHEETS—SHEET 2

INVENTOR.
FREDERICK BROWN
BY
McMorrow, Berman & Davidson
ATTORNEYS

Patented Dec. 16, 1952

2,621,956

UNITED STATES PATENT OFFICE 2,621,956

COMBINATION BUMPER GUARD AND JACK

Frederick Brown, Tampa, Fla.

Application August 4, 1950, Serial No. 177,711

2 Claims. (Cl. 293—69)

This invention relates to a combination bumper guard and jack for a bumper bar of an automotive vehicle.

An object of this invention is to provide a jack which is adapted to be readily assembled with the bumper bar of any automobile to serve as a bumper guard.

Another object of this invention is to provide a jack adapted to be firmly mounted on the bumper bar of an automobile, the jack forming a protective bumper guard which is decorative and ornamental.

A further object of this invention is to provide a combination bumper guard and jack which is light in weight, relatively simple in construction and cheap to manufacture.

The above and still further objects and advantages of the invention will become apparent upon consideration of the following detailed description of the invention, when taken in conjunction with the accompanying drawings, wherein:

Figure 1 is a front elevational view of the combination bumper guard and jack of the present invention, shown mounted on the bumper bar of an automotive vehicle;

Figure 2 is a sectional view taken along the line 2—2 of Figure 1;

Figure 3:
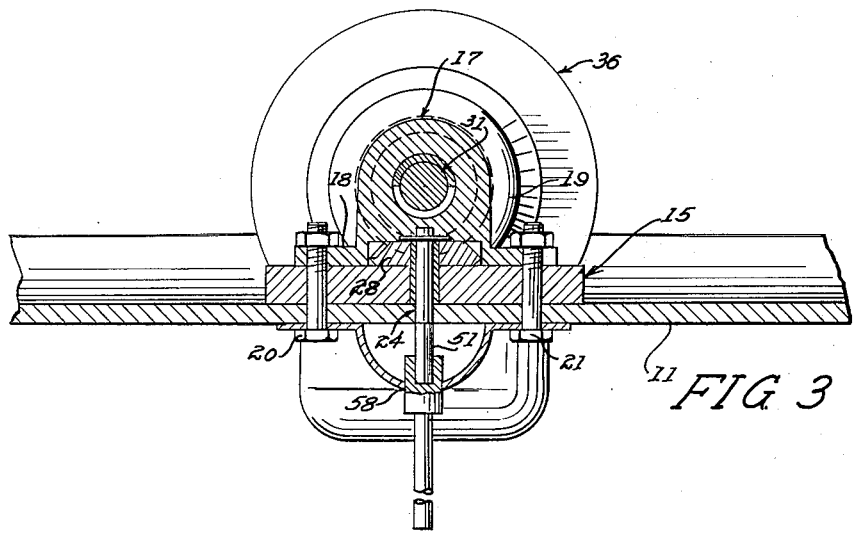
Figure 3 is a sectional view taken along the line 3—3 of Figure 1.
Figure 4:
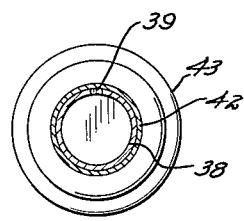
Figure 4 is a sectional view taken along the line 4—4 of Figure 1.

Referring now more particularly to the drawings, wherein like reference numerals have been used throughout the several views to designate like parts, there is shown the combination bumper guard and jack of the present invention, generally designated by the reference numeral 10, shown secured to the bumper bar 11 of an automotive vehicle.

Figure 6:
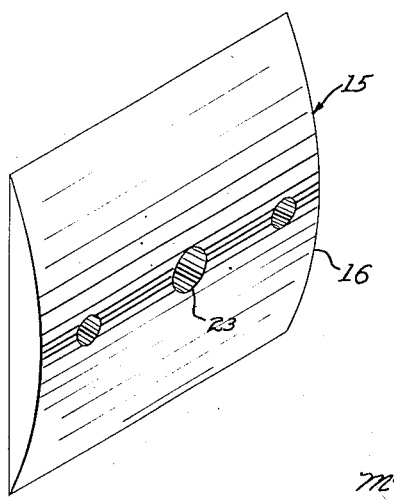
Figure 6 is a perspective view of an adapter plate forming a part of the combination bumper guard and jack of the present invention.

The combination bumper guard and jack 10 embodies a hollow bumper guard 12 adapted to engage the outer surface of the bumper bar 11. The bumper guard 12 is provided with a chrome finish and includes opposed lateral extensions 13 and 14 which abut against the adjacent face of the bumper bar 11. Abutting against an opposed portion of the inner face of the bumper bar 11 is an adapter plate 15, Figure 6, which has one face 16 shaped complementary to the adjacent face of the bumper bar 11. Abutting against the other face of the adapter plate 15, which is plane, is a jack housing or jack screw housing 17 which includes lateral opposed extensions 18 and 19.

As clearly shown in Figure 3, bolts extend transversely through the assembly of the outer bumper guard 12, the bumper bar 11, the adapter plate 15, and the jack housing 17, for detachably securing the assembly to the bumper bar 11, the bolts being designated by the reference numerals 20 and 21.

Extending transversely through aligned apertures 22, 23 provided in the bumper bar 11 and the adapter plate 15 is a shaft 24 which has one end projecting into said bumper guard and adapted to be engaged by a crank handle 25, and has the other end projecting into the jack housing or jack screw housing 17. The shaft 24 extends through an opening in the bumper bar and is rotatably journaled intermediate its ends in the adapter plate 15, the end projecting into the jack housing or jack screw housing being journaled therein, as indicated by the reference numeral 26.

As clearly shown in Figure 2, the face of the jack housing or jack screw housing 17 contiguous to the adapter plate 15 is provided with a longitudinally extending slot 27 which has its lower end in communication with a transversely extending slot 28' provided in the jack housing. Positioned within the longitudinally extending slot 27 and secured to the adjacent projecting end of the shaft 24 is a beveled gear 28. The jack housing or jack screw housing 17 is further provided with a longitudinally extending bore 30 accommodating a longitudinally slidable jack shaft or jack screw 31 which is provided with a screw-thread 32. Rotatably supported within the transversely extending slot 28' is a beveled pinion 33 which is in meshing engagement with the gear 28 and is provided with an internally threaded bore receiving the jack shaft 31. The upper face of the beveled pinion 33 bears against the adjacent bounding wall of the slot 28', and, upon being rotated by the gear 28, will cause the jack housing 17 to climb the shaft 31. The lower end of the jackshaft 31 is rounded, as indicated by the reference numeral 35, and is embracingly received and supported within the jack base 36. The jack base 36 is circular and has a diameter large enough to support the jackshaft 31 with the desired stability. It is readily apparent that the disassembly of the jackshaft 31 and the supporting base 36 can be effected by merely moving the lower arcuate end out of its supported position.

Circumposed about the upper end of the jackshaft 31 is an auxiliary bumper guard, generally designated by the reference numeral 37 which slidably receives the jackshaft and is supported on the jack housing 17. The auxiliary bumper guard embodies a tube 38 which is provided with a longitudinally extending slot 39, the slot receiving a pin 40 extending transversely of and secured to the adjacent end of the jackshaft 31. The jackshaft 31 also carries a spring biased ball 41 which is engageable with an opposed portion of the tube 38. It is to be noted that the spring-biased ball 41 prevents a rattle from developing between the upper end of the jackshaft 31 and the pipe 38 circumposed thereabout. The pin 40 cooperates with the longitudinally extending slot 39 to support the jackshaft for sliding non-rotative movement with respect to the auxiliary bumper guard 37. Circumposed about the tube 38 is a chromium sleeve 42 which forms a decorative covering for the bumper guard 37 and bridges the slot 39 to thereby form a dust-proof chamber for the reception of the upper end of the jackshaft 31. The dust-proof chamber is completed by a decorative closure cap 43 which is supported on the upper open ends of the tube 38 and the chromium sleeve 42.

Figure 5:
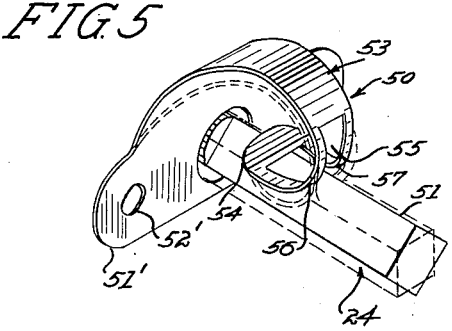
Figure 5 is a perspective view of a locking device forming a part of the jack of the present invention.

Carried interiorly of the bumper guard 12 is a locking device, generally designated by the reference numeral 50, Figure 5, which is normally in contacting engagement with the adjacent end of the shaft 24 and restrains the latter against rotation. As clearly illustrated in Figure 5, the adjacent end of the shaft 24 is squared, as illustrated by the reference numeral 51, and has its free end adapted for support within the socket 52 of the crank handle 25. The locking device embodies a plate 51' which is provided with apertures 52' for the extension therethrough of securing elements to thereby secure the plate 51' in abutting engagement with respect to the adjacent exterior face of the bumper bar 11. Fixedly secured to the upper end of the plate 51' is a resilient arm 53 which has its free end 54 turned downwardly and inwardly, as shown. A slot 55 extends inwardly from a point contiguous to the free end of the arm 53 and terminates at a point substantially midway between the ends of the arm 53. The side bounding walls 56, 57 of the slot 55 normally bear against the adjacent faces of the squared end 51 of the shaft 24 to normally restrain the latter against rotation. It is to be noted that the locking device 50 also supplies the constant pressure to the shaft to prevent the latter from rattling within the assembly of the bumper guard 12, the adapter plate 15 and the jack housing 17. Upon inserting the socket 52 of the crank handle 25 into the aperture 58 provided in the outer bumper guard 12, the end face of the socket will bear against the adjacent portion of the resilient arm 53, to thereby urge the side edges 56, 57 of the slot 55 out of their position of engagement with the crankshsaft 24 to thereby permit the free rotation of the latter. It is to be further noted that the resilient arm will bear against the socket 52 when the latter is supported on the crankshaft 24 to thereby effectively restrain the crank handle 25 against removal from its supported position.

In actual use, the securement of the outer bumper guard 12, the adapter plate 15 and the jack housing 17 to the bumper 11 is effected by means of the bolts 20 and 21. Upon inserting the socket 52 of the crank handle 25 into the aperture 58 provided in the outer bumper guard 12, the locking device 50 is brought out of its contacting position with the crankshaft 24 to thereby permit rotation of the latter by the crank handle. Upon imparting a counterclockwise rotation to the crank handle, a clockwise rotation will be imparted to the beveled jack gear 33 to thereby urge the latter upwardly along the jackshaft 31, the upward movement causing a corresponding upward movement of the assembly of the bumper 11 and the outer bumper guard 12, the adapter plate 15 and the jack housing 17. Accordingly, the position of the bumper 11 can be effectively varied within the limits predetermined by the length of the jackshaft 31. It is to be noted that the jackshaft 31 is non-rotatably held within the auxiliary bumper guard 37, and accordingly will not turn on the supporting base 36.

Although only one embodiment of the combination bumper guard and jack of the present invention has been described, it is readily apparent that numerous modifications can be made without departing from the spirit of the invention as set forth in the appended claims.

What I claim is:

1. In a combined bumper guard and jack, a bumper guard for engagement with the outer surface of a bumper bar, and adapter plate for engagement with the inner surface of the bumper bar, a jack screw housing engaging the adapter plate, means securing the bumper guard, adapter plate, and jack screw housing together and adapted to secure the bumper guard, adapter plate, and jack screw housing on the bumper bar, a shaft journalled in said adapter plate having one end extended through opening means provided in the bumper guard and another end extended in opening means provided in the jack screw housing, a crank being adapted to be engaged with the said one end of the shaft for rotating the same, a gear wheel fixed on the said other end of the shaft, said jack screw housing having a bore, a jack screw extending slidably through said bore, a pinion rotataby circumposed upon and threaded on the jack screw, said pinion having an end engaged with a portion of said housing to oppose displacement of the pinion in one direction, said gear wheel being in mesh with said pinion, and means precluding rotation of the jack screw relative to the jack screw housing as said shaft is rotated in a direction to turn said gear wheel and pinion to move said jack screw endwise relative to the jack housing in the opposite direction.

2. In combination, a vehicle bumper bar, a bumper guard engaging one side of said bumper bar, an adapter plate engaging the opposite side of said bumper bar, a jack screw housing mounted on said adapter plate, means engaging and securing together bumper guard, bumper bar, adapter plate, and jack screw housing, a jack screw mounted in the jack screw housing and extensible therefrom, and means for extending the jack screw from the housing comprising a shaft operatively connected to the jack screw, said shaft extending through opening means provided in the adapter plate, bumper bar, and bumper guard and terminating in an end to which a crank is applicable for turning the shaft.

FREDERICK BROWN.

REFERENCES CITED

The following references are of record in the file of this patent:

UNITED STATES PATENTS

| Number | Name | Date |
|---|---|---|
| 1,828,913 | Toomey et al. | Oct. 27, 1931 |
| 2,070,050 | Hoecker | Feb. 9, 1937 |
| 2,213,840 | Hoecker | Sept. 3, 1940 |
| 2,215,146 | Compano | Sept. 17, 1940 |